Patented Sept. 29, 1953

2,653,894

UNITED STATES PATENT OFFICE 2,653,894

INSECT REPELLENTS

Melvin S. Newman, Columbus, Ohio, and William B. Wheatley, Syracuse, N. Y., assignors to the United States of America as represented by the Secretary of the Army No Drawing. Original application December 29, 1948, Serial No. 68,043. Divided and this application November 15, 1950, Serial No. 204,499

2 Claims. (Cl. 167—22)

This application is a division of our application Serial No. 68,043, filed December 29, 1948, for Insect Repellents (now abandoned).

This invention relates to insect repellents.

We have found that the application of diols of the general formula $A(OH)_2$, in which A is an unsaturated aliphatic hydrocarbon radical having from 10 to 14 carbon atoms, including an open chain of from 8 to 10 carbon atoms, characterized by a double or triple carbon to carbon bond, and in which the hydroxyl groups are alcoholic and attached to different carbon atoms on either side of the multiple bond, when applied to the human skin or to a fabric, afford effective protection against insect bites, by repelling insects, particularly Aedes aegypti and Anopheles quadrimaculatus.

Tests to measure the repellency of the above-mentioned compounds against insects by skin application were conducted by smearing the compound on the arms of test personnel, who then thrust their arms into cages containing insects. The arms were exposed for 30-minute intervals at 3 minutes each until the first insect bite.

Tests to measure the repellency of fabrics impregnated with the above-mentioned compounds against insects were conducted by uniformly impregnating mercerized cotton hose with the compound at a rate equivalent to 3.3 gms. per sq. ft., drawing the dried hose over the arms of test personnel, who then thrust their covered arms into cages containing insects for 1 to 2 minutes.

The following tables illustrate the results obtained by the above test methods against Aedes aegypti and Anopheles quadrimaculatus, as examples of insects against which the invention is applicable, by using unsaturated aliphatic hydrocarbon diols in accordance with the present invention:

Table I.

| Material | Insect Repellency upon Application to Skin | |
|---|---|---|
| | Aedes aegypti | Anopheles quadrimaculatus |
| | Min. | Min. |
| 2,5,7-trimethyl-3-octenediol-2,5 | 315 | 36 |
| 2,5,7-trimethyl-3-octynediol-2,5 | 270 | 41 |
| 3,6,8-trimethyl-4-nonynediol-3,6 | 221 | 33 |

Table II.

| Material | Insect Repellency of Impregnated Fabric against Aedes aegypti |
|---|---|
| 3,6-dimethyl-4-octynediol-3,6 | over 10 days. |
| 2,5,7-trimethyl-3-octynediol-2,5 | Do. |
| 3,6,8-trimethyl-4-nonynediol-3,6 | Do. |
| 2,4,7,9-tetramethyl-5-decynediol-4,7 | Do. |

It will be noted that in the unsaturated open chains of the compounds listed in Tables I and II, methyl substituents are attached to the same carbons as the alcoholic hydroxyl groups. Thus the triple-bond diols contemplated by the present invention may be represented by the general formula

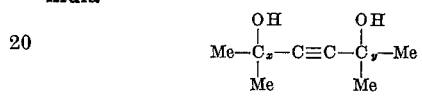

and the double-bonded diols by the general formula

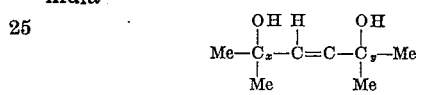

wherein $x$ and $y$ are integers greater than 1.

For ease of application, the unsaturated aliphatic hydrocarbon diols contemplated by the present invention may be incorporated in a suitable inert liquid or solid carrier such as mineral oil, alcohol, petrolatum, etc. For facile and uniform fabric impregnation, they may be applied in an inert solvent, such as alcohol, ether, etc.

Having thus described our invention,

We claim:

1. An Aedes aegypti repellent composition comprising a trimethyl-octene-diol in which the hydroxyl groups are alcoholic and attached to methyl-substituent-carrying carbon atoms on either side of the double bond, in a non-toxic insect-repellent-adjuvant as a carrier therefor.

2. An Aedes aegypti repellent composition comprising 2,5,7-trimethyl-3-octenediol-2,5 in a non-toxic insect-repellent-adjuvant as a carrier therefor.

MELVIN S. NEWMAN.
WILLIAM B. WHEATLEY.

(References on following page)

References Cited in the file of this patent

UNITED STATES PATENTS

| Number | Name | Date |
|---|---|---|
| 2,254,665 | Ralston | Sept. 2, 1941 |
| 2,407,205 | Wilkes | Sept. 3, 1946 |

OTHER REFERENCES

OSRD, Insect Control Comittee Report No. 28, Interim Report No. O-94; May 18, 1945. Particularly page 34, Orlando No. O-4356, 2,5-dimethyl-3-hexene-2,5-diol. Also, pages 15, 39 and 48, Orlando Nos. O-7159, O-7159 and O-7095, respectively, for 2,4,7,9-tetramethyl-5-decynediol-4,7 and 2,5-dimethyl-3-hexyndiol-2,5 (in triacetin soln).

Linduska, "Flea Repellents for Use on Clothing." Journal Econ. Entomology, December 1946, pages 767 to 769, especially at page 768, column 2; 2,5,7-trimethyl-3-octynediol-2,5.